UNITED STATES PATENT OFFICE.

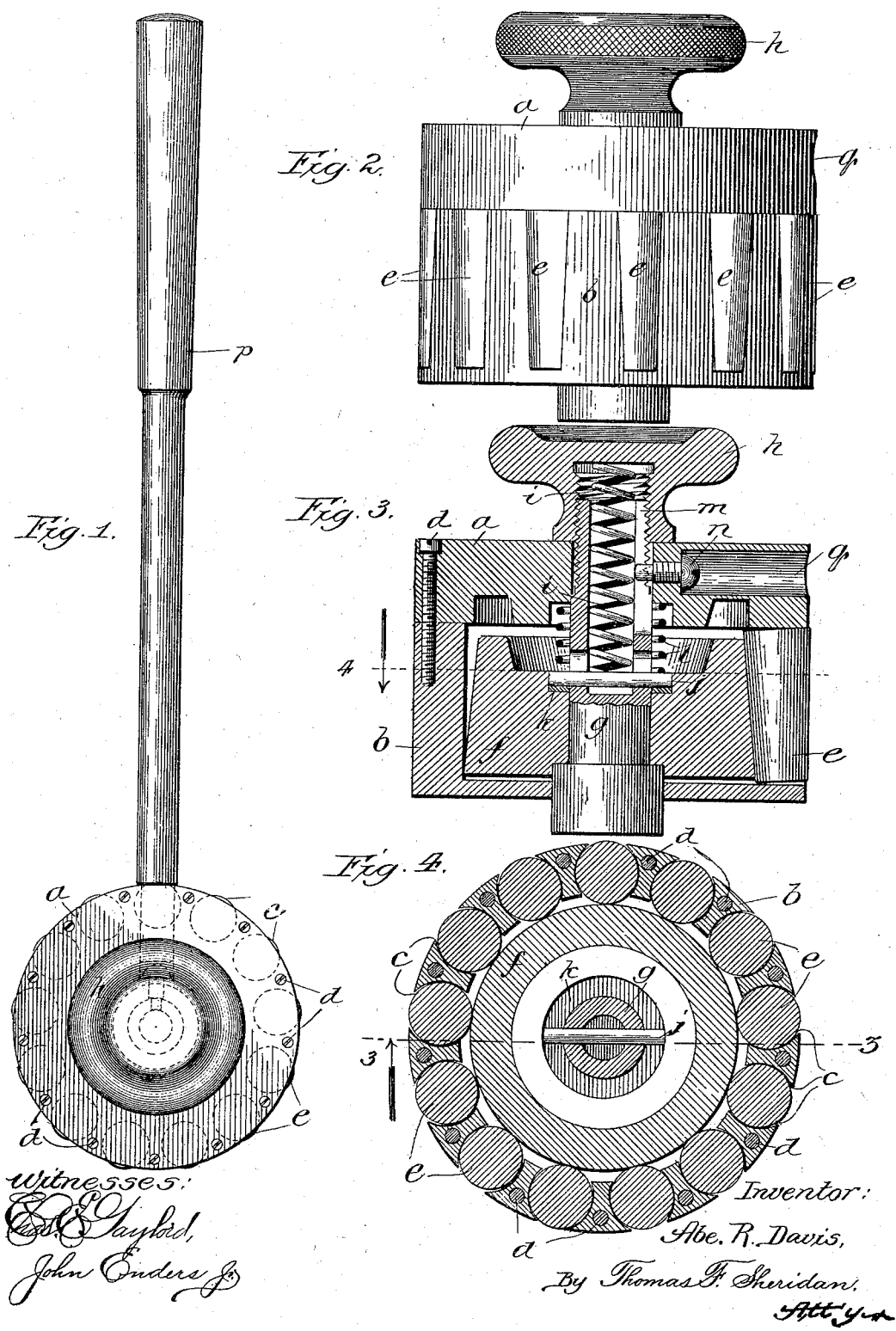

ABRAHAM R. DAVIS, OF TOPEKA, KANSAS.

MACHINE FOR TRUING PISTON-RING BUSHINGS.

SPECIFICATION forming part of Letters Patent No. 705,738, dated July 29, 1902.

Application filed March 24, 1902. Serial No. 99,782. (No model.)

*To all whom it may concern:*

Be it known that I, ABRAHAM R. DAVIS, a citizen of the United States, residing at Topeka, in the county of Shawnee and State of Kansas, have invented certain new and useful Improvements in Tools for Truing Piston-Ring Bushings, of which the following is a specification.

This invention relates to that class of mechanisms which are adapted to be used for the purpose of truing piston-rings, particularly the brass piston-rings of bushings as used in air-brake triple valves, as will more fully hereinafter appear.

The principal object of the invention is to provide a simple, economical, and efficient roller device for truing up the brass piston-ring bushings of air-brake triple valves.

Other objects of the invention will appear from an examination of the drawings and the following description and claims.

The invention consists principally in a tool for truing up piston-ring bushings in which there are combined a plurality of rolls arranged circumferentially around a central point and means for forcing such rolls outwardly.

The invention consists, further, in a tool for truing up brass piston-ring bushings in which there are combined a plurality of rolls arranged circumferentially around a central point and means for forcing such rolls away from the center and permitting them to move toward the center.

The invention consists, further, in a tool for truing up brass piston-ring bushings in which there are combined a main portion, a cage connected therewith, a plurality of tapered rolls arranged circumferentially and loosely in such cage, and an axially-arranged cone by which such rolls are forced outwardly or expanded or permitted to move inwardly or contract.

The invention consists, further and finally, in the features, combinations, and details of construction hereinafter described and claimed.

In the accompanying drawings, Figure 1 is a plan view of a tool constructed in accordance with these improvements looking at it from the top; Fig. 2, an enlarged side elevation of the same with the operating-handle removed; Fig. 3, a vertical sectional elevation taken on line 3 of Fig. 4 looking in the direction of the arrow, and Fig. 4 a sectional plan view taken on line 4 of Fig. 3 looking in the direction of the arrow.

In the art to which this invention relates it is well known that in truing up piston-ring bushings for air-brake triple valves it is usual to true up the same by grinding out the same, which operation is expensive in that the rings or bushings must first be removed from the valve, placed in a grinding-machine, trued up, and finally ground out. As this work has necessarily to be done by high-priced labor and takes up considerable time, it will be seen that when compared with the improvements hereinafter set forth a considerable saving of time and labor is effected by the use of these improvements.

In constructing a tool in accordance with these improvements I make a cap portion $a$ of the desired size, shape, and strength to hold the operative and other parts in position for use. Secured to the lower part of this cap portion is a cage portion $b$, provided with a multiplicity of tapered recesses $c$, arranged longitudinally and in the periphery thereof for the reception of the truing-rolls, hereinafter described. This cage portion is secured to the cap portion by means of a plurality of cap-screws $d$.

To true up the inner surface of a brass piston-ring bushing of a triple valve, a plurality of tapered truing-rolls $e$ are provided and inserted in the tapered recesses of the cage, as shown particularly in Fig. 4. These truing-rolls are loosely arranged in such cage; but it will be seen that although the tapered recesses in such cage are slightly larger than the rolls yet they are of such shape as to retain the rolls in their operative position. These rolls are arranged with their larger diameter at the top and their smaller diameter at the bottom, so that the outer portion thereof may be forced to occupy a plane parallel with the axis of the machine and all of the rolls when taken together, or their surfaces, which occupy the outer peripheral portion of the tool, may be made to occupy a parallel cylindrical plane, and thus effectually operate to true up the bushing.

To provide means for forcing the rolls outwardly and permitting them to move inwardly, so as to roll or true out the piston-bushing in a cylindrical manner, an axially-arranged cone $f$ is provided with its conical surface contacting the inner surfaces of all the rolls, so that as such cone is moved upwardly or downwardly the rolls are moved outwardly or permitted to move inwardly. To move this cone upwardly and downwardly, a headed screw-shaft $g$ is provided, with its head bearing against the lower part of the cone and the screw portion extending out above the top of the cap, as shown particularly in Figs. 2 and 3. Engaging this threaded projecting end of the screw-shaft is a hand-nut $h$, which when rotated in one direction operates to pull the shaft upwardly, and thereby raise the cone so as to expand the truing-rolls, while a rotation of such hand-nut in the other direction permits the shaft to drop backward with the cone, so as to permit the truing-rolls to move inwardly.

It is desirable to have some means to assist the shaft and cone to be moved downward. In order to accomplish this, the shaft is hollowed out axially and a helical spring $i$ inserted therein between the inner surface of the hand-nut and against a pin $j$, passed transversely through the screw-shaft and bearing in a ring $k$, which in turn bears against the cone. A second helical spring $l$ is provided and inserted between the cap and ring $k$, as shown particularly in Fig. 2, the action of both springs being to assist in the operations of the nut, the cap, and the shaft when the hand-screw is rotated in a loosening direction, and thus permit a more ready contraction of the truing-rolls.

In order to prevent the screw-shaft from having a rotation independent of the cap portion—in other words, to prevent the screw-shaft from turning when the hand-wheel is being turned—the shaft is slotted, as shown at $m$ in Fig. 3, and a set-screw $n$ inserted through the cap with its end resting in such groove or slot, thus preventing such screw-shaft from rotating when the hand-wheel is being rotated and assisting it in more effectually performing its operations.

During the operation it is desirable to have some means for moving the parts. In order to accomplish this, an operating hand-lever $p$ is provided and engaged with the opening $q$ in the cap portion, so that considerable lever action may be obtained thereby for rotating or vibrating the tool and to accomplish the truing of the ring-bushing.

In operation the hand-nut is turned to such a position as to permit the tapered truing-rolls to contract. The machine is then placed inside the ring-bushing with the smaller ends of the truing-rolls inward. The operator then grasps the hand-nut and turns the same to the right, so as to pull the cone upwardly or inwardly, as the case may be, thereby forcing the truing-rolls outwardly until they contact with the bore of the ring-bushing in a cylindrical manner. The operating hand-lever is then vibrated backwardly and forwardly or turned completely around, as the position permits, until the truing-rolls have accomplished the necessary amount of work. If the scratching or low spots in the bushing have not been entirely removed or trued out, a further rotation of the hand-nut forces the truing-rolls into more intimate engagement with the ring-bushing. The operator again vibrates the hand-lever $p$, repeating such operations until all of such defects have been removed and the ring-bushing is entirely trued out, all of which will be understood and appreciated by those skilled in the art.

I claim—

1. In a tool of the class described, the combination of a cap portion, a cage removably secured thereto and provided with a multiplicity of tapered recesses arranged longitudinally in its periphery, a plurality of tapered rolls loosely mounted in such recesses, a cone portion arranged in a cage with its conical surface contacting with the tapered rolls, a screw-shaft in connection with such cone and extending out through the cap, and a hand-nut on such screw-shaft for operating the cone to expand and contract the rolls, substantially as described.

2. In a tool of the class described, the combination of a cap portion, a cage removably secured thereto and provided with a multiplicity of tapered recesses arranged longitudinally in its periphery, a plurality of tapered rolls loosely mounted in such recesses, a cone portion arranged in a cage with its conical surface contacting with the tapered rolls, a screw-shaft in connection with such cone and extending out through the cap, a hand-nut on such screw-shaft for operating the cone to expand and contract the rolls, and spring mechanism inserted between the hand-nut and the cone to assist in the retraction of the same, substantially as described.

3. In a tool of the class described, the combination of a cap portion, a cage removably secured thereto provided with a multiplicity of tapered openings arranged longitudinally in its peripheral surface, a plurality of tapered rolls loosely mounted in such recesses, a movable cone arranged in the cage with its conical surface contacting with the tapered rolls, a shaft engaging such cone and provided with a threaded end extending out through the cap and a central longitudinal bore, a hand-nut on the threaded end of the shaft, and spring mechanism in the axial bore of the screw-shaft and bearing against the inner surface of the hand-nut to assist in the retraction of the cone, substantially as described.

4. In a tool of the class described, the combination of a cap portion, a cage portion removably secured thereto and provided with a multiplicity of tapered recesses arranged longitudinally in its periphery, a plurality of tapered rolls loosely arranged in such recesses, a movable cone arranged in the cage with its cone surface contacting with the tapered rolls, a headed shaft engaging such cone provided with a threaded end extending out through the cap, a central longitudinal bore and a transverse opening, a hand-nut engaging the threaded end of the shaft, a pin extending through the transverse opening of the shaft, a ring in engagement with the cone bearing against the transverse pin, and a spring bearing against such pin and the hand-nut, substantially as described.

5. In a tool of the class described, the combination of a cap portion, a cage removably secured thereto and provided with a multiplicity of tapered recesses arranged longitudinally thereof, the larger diameters of such recesses being arranged adjacent to the cap portion, a plurality of tapered rolls arranged in such recesses, a movable cone arranged in the cage with its conical surface contacting with the tapered rolls, a headed shaft engaging the cone and provided with a threaded end extending out through the cap with a central longitudinal bore a transverse perforation and a radial slot, a hand-nut engaging the threaded end of such shaft, a pin passed through the transverse perforation of such shaft, a ring intermediate such pin and the cone, a spring intermediate the hand-nut and the transverse pin, a second spring intermediate the cap and the cone, and a set-screw or similar element passed through the cap and engaging the radial slot of such shaft, substantially as described.

6. In a tool of the class described, the combination of a cap portion, a cage removably secured thereto and provided with a multiplicity of tapered recesses arranged longitudinally thereof, the larger diameters of such recesses being arranged adjacent to the cap portion, a plurality of tapered rolls arranged in such recesses, a movable cone arranged in the cage with its conical surface contacting with the tapered rolls, a headed shaft engaging the cone and provided with a threaded end extending out through the cap with a central longitudinal bore a transverse perforation and a radial slot, a hand-nut engaging the threaded end of such shaft, a pin passed through the transverse perforation of such shaft, a ring intermediate such pin and the cone, a spring intermediate the hand-nut and the transverse pin, a second spring intermediate the cap and the cone, a set-screw or similar element passed through the cap and engaging the radial slot of such shaft, and a hand-lever engaging the cap for operating the tool, substantially as described.

ABE R. DAVIS.

Witnesses:
ERNEST MUELLER,
W. C. PEYTON.